United States Patent [19]
Brunette

[11] 3,986,013
[45] Oct. 12, 1976

[54] METHOD AND APPARATUS FOR CONTROLLING YIELD OF DISCRETE PIECES AND CHARACTERISTICS THEREOF

[75] Inventor: Norman R. Brunette, Clover, S.C.

[73] Assignee: Automated Energy Systems, Inc., Matthews, N.C.

[22] Filed: Oct. 3, 1974

[21] Appl. No.: 511,528

[52] U.S. Cl. .......................... 235/151.33; 28/72 R; 73/73
[51] Int. Cl.[2] ..................... G06F 15/46; F26B 13/12
[58] Field of Search ........ 235/151.33, 151.3, 151.1, 235/151.35; 73/73, 75; 28/72 R

[56] References Cited
UNITED STATES PATENTS

| | | | |
|---|---|---|---|
| 3,216,241 | 11/1965 | Hansen | 73/75 |
| 3,260,642 | 7/1966 | Canter, Jr. | 162/252 |
| 3,536,258 | 10/1970 | Rocheleau | 235/151.3 |
| 3,566,092 | 2/1971 | Grant et al. | 235/151.3 |
| 3,626,165 | 12/1971 | McCall | 235/151.3 |
| 3,634,187 | 1/1972 | Chari et al. | 235/151.33 X |
| 3,666,621 | 5/1972 | Adams | 235/151.3 X |
| 3,687,802 | 8/1972 | Rummel et al. | 235/151.3 X |
| 3,843,434 | 10/1974 | Heiks et al. | 235/151.3 X |
| 3,847,730 | 11/1974 | Doering | 235/151.3 X |

Primary Examiner—Edward J. Wise
Attorney, Agent, or Firm—Wilfred G. Caldwell

[57] ABSTRACT

The method and apparatus of controlling moving fabric weight per unit length in strips made up of different pieces which comprises predetermining the desired absolute weight per unit length of the finished fabric; predicting accurately the absolute weight per unit length of the moving finished fabric; determining any error difference in the absolute weights, recognizing the beginning and end of each piece of fabric; adjusting the input feed rate according to the error difference between the desired weight of the finished fabric and the predetermined finished weight; determining that a new piece of fabric has reached the exit site of a primary feed station; predicting accurately the weight of a new piece of pre-finished material and comparing this weight with the stored weight of pre-finished material of the prior piece to determine the percentage difference in weight of the prior piece in the formative zone or tenter to the new piece that will subsequently reach the infeed station to the tenter; and controlling the motor speed feeding the fabric to the tenter to produce the predetermined absolute weight per unit length in the finished fabric.

13 Claims, 9 Drawing Figures

METHOD AND APPARATUS FOR CONTROLLING YIELD OF DISCRETE PIECES AND CHARACTERISTICS THEREOF

The present invention controls the absolute weight of fabric as it is being finished on machinery conventionally referred to as a tenter, a finishing range, a heat set range, or a heat set tenter. Absolute weight is the dry weight of the finished fabric.

In the processing of textile fabrics, it is necessary to control the weight of the fabric as it is being finished. For example, assume fabric that is knitted or woven at 8 oz./linear yard is required to be finished at 10 oz./linear yard. Obtaining this additional 2 oz./linear yard is accomplished by controlled "overfeeding" of the fabric as it enters the tenter. Conversely, the fabric could be knitted or woven at 10 oz./linear yard and have to be finished at 8 oz./linear yard. In this case, controlled "underfeeding" of the fabric would produce the results desired. Since the fabric is normally moving at between 10 and 200 yards per minute, it is presently very difficult to obtain a real time indication of what the weight of the fabric is as it is being finished. Since it is difficult to measure, it is equally difficult to control.

Present techniques of measurement include "batching" from 30 to 1,000 yards and weighing the fabric. Calculation then gives a weight/unit length. Another technique being used is to cut samples out of the fabric and use a balance to determine weight. Still another technique is to predict the amount of "overfeed - underfeed" based on the weight of the pre-finished fabric. The inherent problem with all the above techniques is that it is not possible to know if the emperical action taken was correct until after the fact, which in some cases allows hundreds of yards to be finished at incorrect weights.

Double knit goods present an especially difficult problem because of the fact that pieces are relatively short - 40 to 70 yards. The pieces are the production of individual knitting machines. There may be hundreds of such knitting machines working on one style and each machine will knit at a different weight per unit length. At times, this difference can be as much as 10%. These pieces are then sewn together end to end to be run through the tenter for the finishing operation. Since the piece to piece variation is as much as 10%, it is presently very difficult to make overfeed adjustments based on the finished absolute weight, since the next piece entering the tenter could be different than the piece presently being measured, bearing in mind that the tenter itself is from 20 to 40 yards long.

The method of the present invention involves measuring, as by scanning each piece to determine average density, and controlling the weight per unit length of the fabric as it enters the tenter and measuring the absolute weight as it exits the tenter. Furthermore, this measurement is preferably by a non-contact technique that can measure as the fabric is being processed at speeds up to 200 yards per minute. The combination of measurements along with unique logic techniques allows control of the overfeed - underfeed mechanism, resulting in control accuracy considered to be impossible prior to the use of the present apparatus and method.

Even though fabric might be referred to as 10 oz./linear yard, there can be variations across the width of the fabric.

Reference to the drawings will be made at this point in order to better illustrate the principles of the invention. In the drawings.

Figure 1:
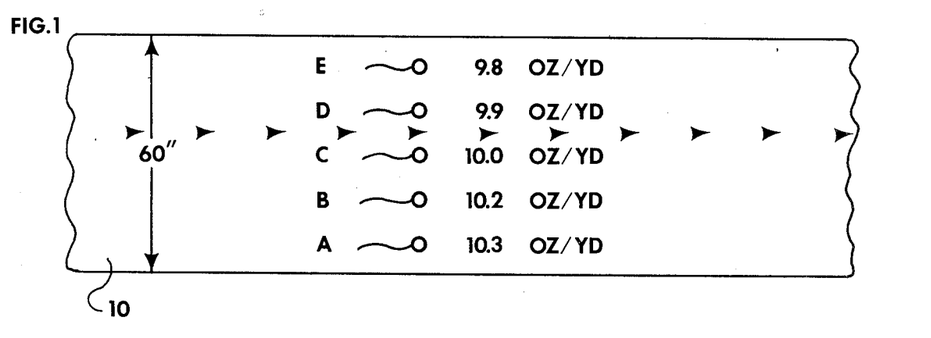
FIG. 1 shows a piece of fabric and illustrates the possibility of various weights in ounces per linear yard of fabric as detected at points A, B, C, D and E.

FIG. 1 shows a piece of fabric 10, 60 inches wide, and points A through E indicate the individual weight variations available from samples taken from those points. To obtain a good representative reading, it is necessary to measure at a number of points and average, or scan the fabric with a single unit and integrate and average. Both techniques are utilized herein. The device used to get either the multipoint or scanned measurement is referred to as a Beta Gauge and is commercially available on the market.

Figure 2:
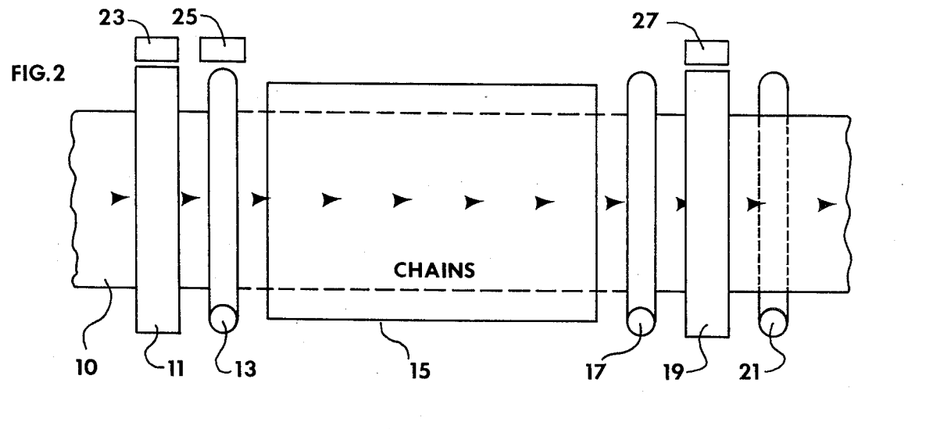
FIG. 2 is a schematic representation of the control system applied to a tenter wherein the system includes entrance and exit scanning and seam detection.

FIG. 2 represents a tenter that could be between 20 and 40 yards in length. Symbols 11 and 19 represent Beta Gauges located at the points at which measurements are taken. Fabric at both these points preferably is kept at absolute minimum tension. Both locations of gauges 11 and 19 are what is considered to be off frame or before and beyond the tenter. Roller 13 represents the overfeed - underfeed section considered to be the beginning of a tenter and roller 17 represents the stripping rolls which are generally considered to be the end of the tenter. Equipment located respectively, prior to, or after, gauge 11 and 19 locations, is considered to be off frame. Off frame measurement is considered to be of paramount importance for successful operation of the system because the fabric is under considerable tension while on frame. Tension adversely affects the accuracy of measurement.

The Beta Gauge(s) 11 not only "sees" the fabric weight but also sees moisture, oil, and other finishing solvents. Since the gauge reacts to all mass (density) in a similar manner, very elaborate techniques must be used to determine what portion of the measurement is caused by fabric weight and what portion is caused by the foreign matter mentioned above. There are a number of approaches to use, but the one considered most advantageous is concerned only with the changing weight from piece to piece, and not by the absolute weight. If the foreign matter remains constant from the end of one piece to the beginning of the next, then it can be assumed that a change in weight is caused by changing weight of actual fabric, which, as mentioned earlier, could be the result of different knitting machines.

At gauge 19 of FIG. 2, the gauge is looking at dry fabric with foreign matter boiled out. This measurement represents the absolute weight of the finished fabric.

Using a combination of delta (δ) weight at gauge 11 and absolute weight at gauge 19, it is possible to control the speed of the overfeed - underfeed roll 13 with enough accuracy to get the finished weight of the fabric to within one percentage point of the "Target" or desired weight. This can be done consistently for every piece entering the tenter. Prior art techniques of control can seldom get the weight to within five percentage points of target.

As stated earlier, the measurement can be taken across the width with multiple gauges or with a single traversing unit. If multiple heads are used, their individual signals are multiplexed into the control unit. The average of the signals is computed and the result compared against the target for an absolute reading, or against a number stored of the last reading to compute the delta figure.

Measurements alone will not accomplish control. Control action must be coordinated in such a manner so as to assure proper control action on the right pieces at the right time. The device that inputs the signal to satisfy control logic is known as a seam detector. Seam detectors are shown at 23, 25, and 27, of FIG. 2. The seam detectors keep the system informed as to where the beginning and end of pieces are in the process.

It is extremely important the overfeed - underfeed changes be made at specific times only. Usually such times are when the seam hits overfeed - underfeed roll 13. Otherwise, the esthetics, i.e. appearance and feel (characteristics) of the fabric could be changed so much that the fabric would become valueless.

Figure 3:
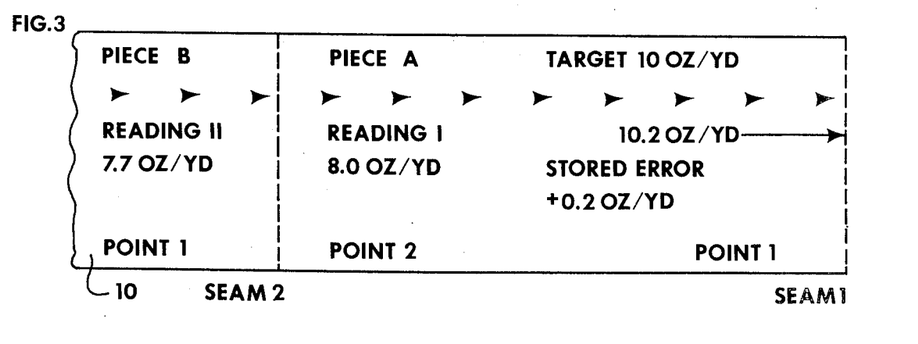
FIG. 3 is a showing of a strip of fabric comprising pieces A and B and having a seam therebetween to illustrate the application of the principles of the present method.

FIG. 3 represents the piece of fabric 10 travelling down the finishing range represented in FIG. 2.

As Point 1, Piece A, FIG. 3 reaches gauge 19 of FIG. 2, it is measured for an absolute weight. Assume this weight is 10.2 oz./yard. The 10.2 figure is compared against the standard target value (e.g. 10 oz./yard) and the percentage of error is stored, i.e. +0.2. This + or − error value is referred to as ± Error 1.

As Point 2, Piece A, FIG. 3, passes under gauge 11, Point A of FIG. 2, it is measured for its total weight value and the number is stored, i.e. 8 oz./yard. This is referred to as Reference Reading I.

As Point 1, Piece B, FIG. 3 passes gauge 11, FIG. 2, it is measured for its total weight, say 7.7 oz./yd. This is referred to as Reading II.

Reading I is compared against Reading II, the difference is referred to as ± Delta 1.

The amount of error Piece B will have if no change is made in the overfeed can now be projected. This is referred to as ± Error 2. Error 2 = Error 1 + Delta 1 = (+ 0.2) + (− 0.3) = −0.1.

In the above example, the following condensed facts and logic determine the speed control for the overfeed - underfeed roll:

| | | |
|---|---|---|
| Piece A dry end (point 1) | = 10.2 | oz./yd. |
| Target standard | = 10 | oz./yd. |
| Error 1 | = + 0.2 | oz./yd. |
| Reference Reading I wet end (point 2) | = 8 | oz./yd. |
| Reading II Piece B | = 7.7 | oz./yd. |
| Difference of Readings ± Delta | = − 0.3 | oz./yd. |
| Error 2 = Error 1 + Delta = (+ 0.2) + (− 0.3) = | = − 0.1 | oz./yd. |
| Correction = Error 2 of opposite sign | = + 0.1 | oz./yd. |

If it is known how much error Piece B will have if no change is made, the correction necessary can be applied to insure Piece B does not have an error. This correction is referred to as ± Correction 1, which is the same in magnitude as Error 2, but of opposite sign. Thus, a speed up correction of + 0.1 is required in this example.

The equation for automatic control, therefore, is as follows:

(± Error 1) + (± Delta 1) = Error 2 or
(+ 0.2) + (− 0.3) = − 0.1
+ Error 2 = − Correction 1
− Error 2 = + Correction 1

This method of control insures that Piece B will exit the range at the correct weight. The same sequence is then followed for all succeeding pieces.

Overfeed changes and logic for control are sequenced according to time delays and counters by the input signals from the seam detectors 23, 25 and 27 of FIG. 2.

It is important to note that although there is considerable weight variation across the width of the fabric, the variations along the longitudinal axis are very small and can be disregarded. This is one factor that allows the assumption that Point 1, Piece A, FIG. 3 weighed the same as Point 2, Piece A, FIG. 3 after finishing. The latter reading is the one from which Delta is computed.

Figure 4:
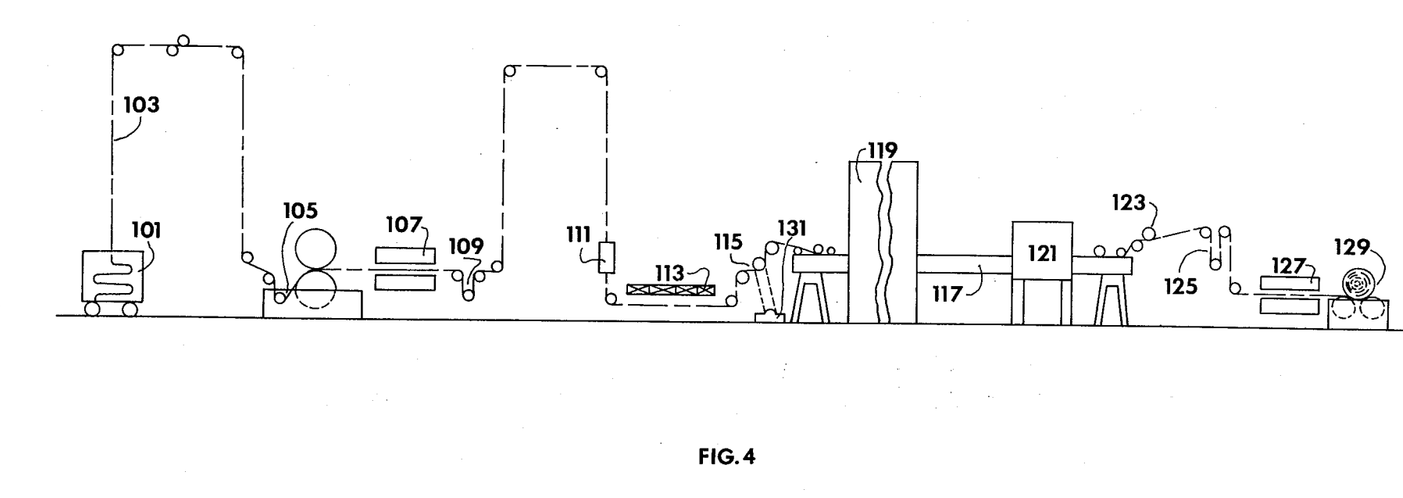
FIG. 4 is a schematic representation of a typical tenter operation to show the additions of the detection and measuring equipment of the present invention.

In FIG. 4, a typical tenter type operation is illustrated in connection with the application thereto of the present control system. Thus, a source of fabric is shown as the bin 101 in which a long strip of fabric, for example, of 900 yards or more in length comprising some 15 or 20 pieces sewn together in end to end fashion, which pieces may be derived from different knitting machines acts as the source of supply for the material to be finished in the tenter assembly of FIG. 4. However, prior to completion of the finishing work on the strip of 900 yards or so, it is possible to attach another strip in another bin and thus render continuous operation and use of the controlled apparatus of this invention.

The fabric follows path 103 through a padder or water mangle which applies water thereto to render it more pliable. This padder is shown at 105 from whence the fabric proceeds to an entrance scanner shown at 107. The preferred scanner for the entrance detection apparatus shown at 107 is a commercially available product known as a Beta gauge in which the transmitter and receiver travel across the bulk of the fabric to develop an analog signal which can be later averaged to provide an indication of average weight of the fabric.

However, it is possible to employ detector heads distributed across the fabric to provide an alternative approach and such an arrangement may employ, for example, two to ten heads, depending upon the width and accuracy desired.

Also, the preferred arrangement includes a dancer or tensioning apparatus shown at 109 so that the fabric won't be distorted under to scanner 107 or detector heads at the station 107. Stated another way, it is desirable that all readings be taken at the same relative tension, but it should be mentioned that station 109 is not absolutely essential to the operation of the control system but is certainly preferred.

It is not necessary that the mangle 105 include water and thus the wet or dry weighed fabric proceeds through guider 111 and under platform 113 (provided for operators to move through the machinery) to the underfeed - overfeed rolls 115. The main purpose of the invention is to control the speed of rolls 115 in order that overfeeding or underfeeding may be established as required to increase the weight of or decrease the weight of the fabric per linear yard.

Ordinarily, motor 131 is already present when the control system is brought to the tenter for annexation thereto and it is converted to automatic control from the normal manual control thereby in return to control the speed of rolls 115.

The tenter conveyor frame is shown at 117 and is used in the normal manner. Similarly, tenter heat set chamber or oven 119 performs its functions. The finished fabric exits via cooling zone 121 and through the bow control or stripping rolls 123 to a further dancer or tensioning device 125 for isolating fabric tension from the exit scanner 127, which again is preferably of the type preferred in connection with entrance scanner 107. The fabric is then delivered to takeup roll 129.

Figure 5:
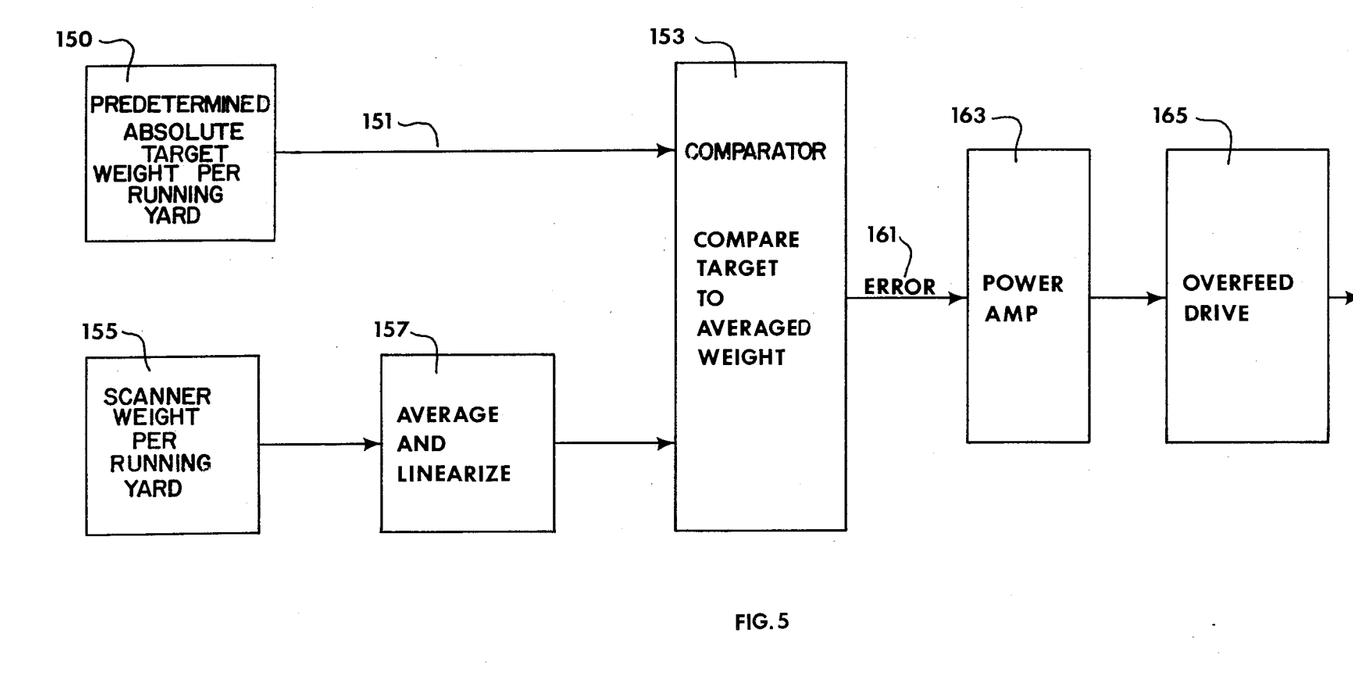
FIG. 5 is a block diagram of a control system employing exit end scanning only without seam detection.

The control system of FIG. 5 is the least expensive system described and is, of course, not as accurate as the more expensive systems because it depends upon the development of an error signal at the exit end only without benefit of seam detection. Thus, the target number is placed in by a thumb wheel switch 150 which applies the appropriate value over lead 151 to comparator 153, which is available from Laboratory For Electronics Corp., Waltham, Massachusetts, known as Log Amplifier Board PB03 D298892. In the case of an analog signal, the thumb switch may actually operate as a slider on a potentiometer and generate an analog signal or in the case of where digital quantities are used conventional comparison techniques are employed and the target number may be applied over a 12 line binary input; in which event, a down counter or the like may be employed in comparator 153 such as disclosed in patent application Ser. No. 243,952, filed Apr. 14, 1972. The commercially available Beta gauges, be it of the scanning or distributed type are illustrated at box 155 for developing an analog weight signal which is averaged and linearized at box 157 (commercially available from Laboratory For Electronics Corp. designated as AV-200 Averaging Computer, and the linearizing network is available under Log Logic Board PB04 C299346) and applied to comparator 153.

Comparison in comparator 153 occurs at the end of each scan which may require some 5 to 30 yards of moving fabric assuming it moves at some 20 to 50 yards per minute. The error signal on lead 161 is then applied through power amp amplifier 163 to the overfeed - underfeed drive control 165. Overfeed drive 165 may comprise the motor 131 or a small AC or DC motor provided to manipulate the manual speed control on motor 131. Typical results obtained with the apparatus of FIG. 5 operating on double knitted fabrics is plus or minus 3% error from target value.

Figure 6:
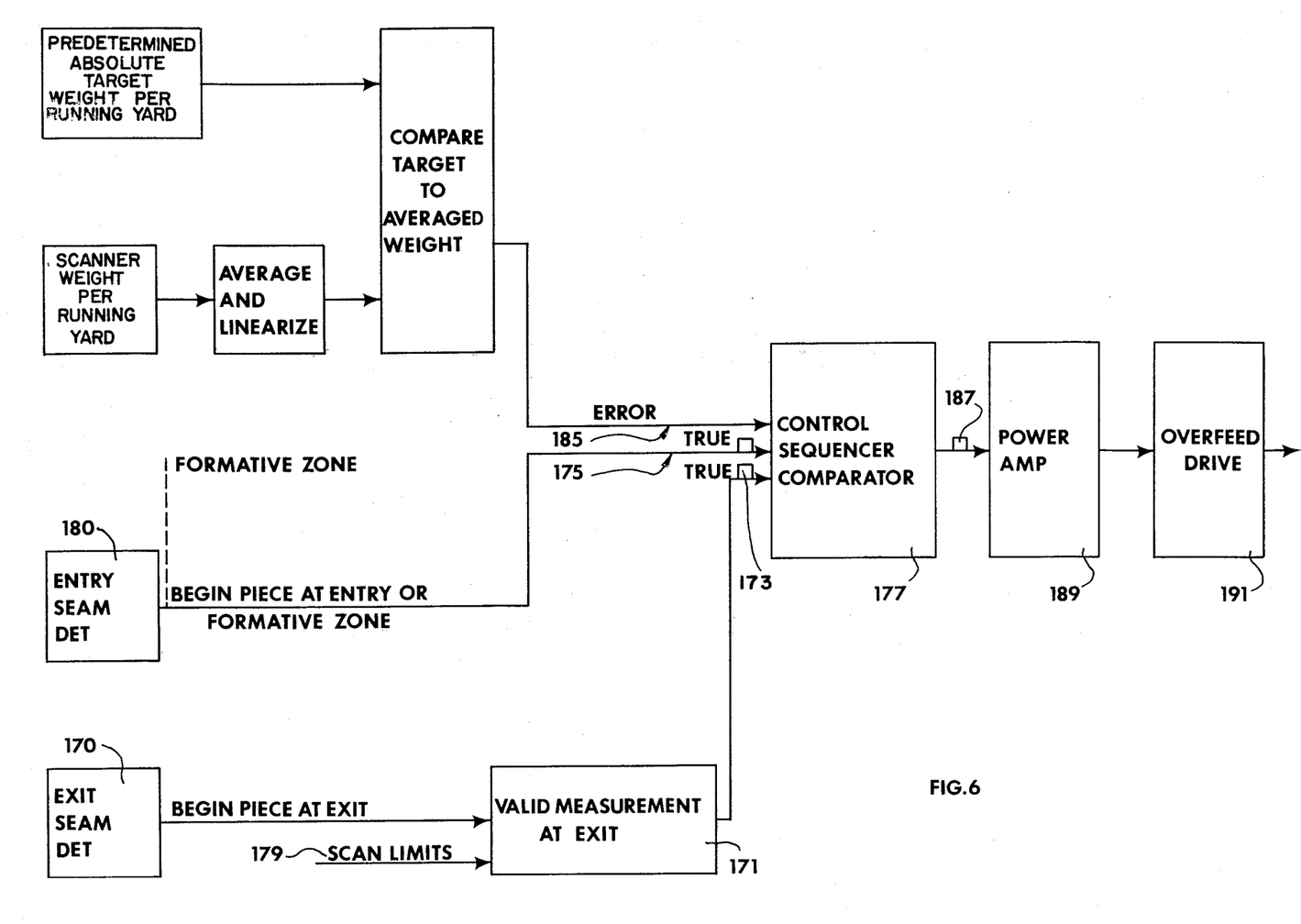
FIG. 6 is a similar arrangement but including seam detection.

In FIG. 6, exit end scanning only is employed but in this apparatus seam detection is added as a result of the components shown to the lower right of the drawing, the other components being the same as described in connection with FIG. 5. Two seam detectors employed with the exit scanner to carry out the control desired based upon a corrective signal developed in accordance with the error of the preceding piece and apply the corrective action at the beginning of the next piece as it enters the overfeed roll.

It will be recalled that the error signal is always present and it is compared against the average weight signal at the end of each scan. The purpose of the exit scan detector 170 is to supply information to the logic shown at the box 171 marked valid measurement at exit. In order to obtain a true signal, shown as 173 on lead 175 which is at one of the inputs to the control sequencer comparator 177, (which in its simplest form is an AND gate) it is most desirable that the error signal be developed while scanning only a single piece and not when the scan traverses a seam. Therefore, it is necessary to know that the scanner has completed a traverse across the strip during a single piece. The scanner may be equipped with scan limit switches or other means may be employed to determine when it begins and ends a scan. Such an input is applied to lead 179 of the logic 171. Thus, after seam detector 170 detects a seam at the exit and the scan limit signal applied to lead 179 is present, a true signal STET appears on lead 175.

The purpose of the entrance seam detector 180 is to insure that the corrective action is initiated on piece B as it enters the formative zone or the overfeed rolls. This is the preferred treatment but corrective action may be taken at any time after the error signal is developed.

Figure 7:
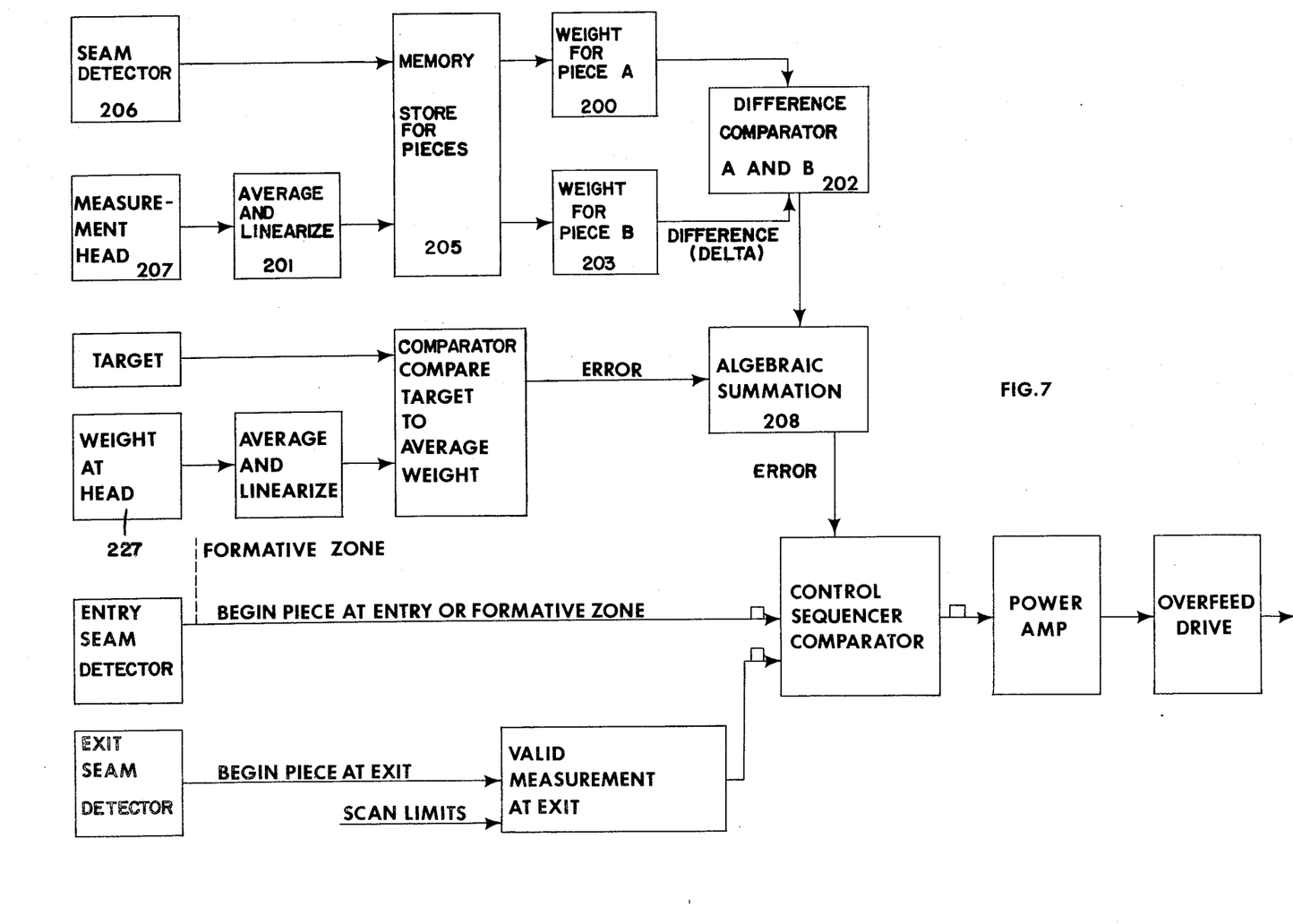
FIG. 7 adds entrance scanning and further electronic associated controls therefor.

In the preferred arrangement, the control sequencer comparator 177 must see a true signal on both leads 175 and 185 to provide an output signal 187 through the power amp 189 and to the overfeed drive mechanism 191. By following these preferred techniques, the greatest accuracy is obtained and on doubleknit fabrics errors have been limited to plus or minus 2% employing the system of FIG. 6. The apparatus of FIG. 7 adds to the apparatus of FIG. 6 the blocks marked 200 through 208. Otherwise, the operation of the previously described components is the same. The purpose of the apparatus of FIG. 7 is for adding detection and logic up front (prior to the tenter) to develop the difference or Delta signal to be added to the error signal previously developed to carry out the logic initially presented, e.g. error 2 equals error 1 plus Delta. Thus, seam detector 206 is added at the location of seam detector 23 of FIG. 2, i.e. at the front scanner 207. These devices are located approximately 10 yards upstream of the overfeed - underfeed correction roll 13 of FIG. 2. Returning to FIG. 7, the block 205 is a memory for storing the weight of piece A as determined by measurement head 207 and average and linearize block 201. This stored quantity is only transferred to the memory of block 200 when seam detector 206 detects the presence of a seam. Automatically, then, on the next scanning completion, measurement head 207 and average and linearize block 201 supplies the weight of piece B from block 205 to its memory 203. Both signals representing the weights of piece A and piece B have been averaged and linearized at the block 201, before storing and the stored signals are outputted and applied to difference determiner 202 (commercially available from Burr-Brown Research Corporation, Addison, Illinois, as an integrated circuit under the title Differential Input Multiplier/Divider 4098/25) for determining the difference between piece A and piece B. The output signal which is the Delta signal of the equations is applied to algebraic summation device 208 which also receives the error signal developed from the dry weight of the prior piece versus the target weight. The difference or Delta signal and the error signal are continuously being applied to the algebraic summer 208 but the control sequencer comparator 177 operates in the manner heretofore explained and only corrects the overfeed drive when the conditions of the logic of the validating block 171 are satisfied.

The target accuracy of the subject apparatus of FIG. 7 is plus or minus 1% on double knitted fabrics.

Figure 8:
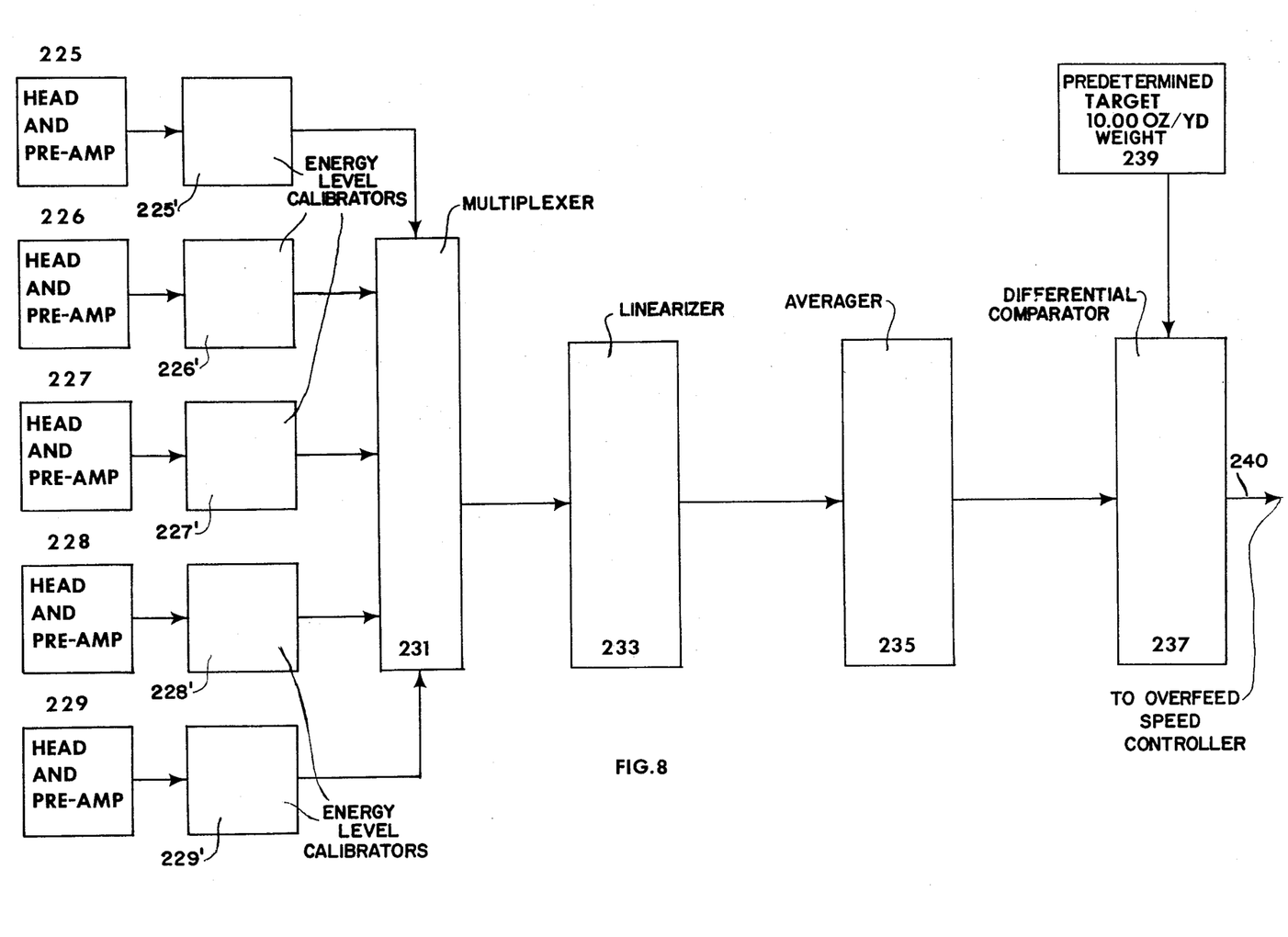
FIG. 8 is a block diagram showing a control system employing five fixed detection heads for distribution across a piece of fabric as discussed in connection with FIG. 1; and, FIG. 9 is a more detailed block diagram to illustrate the electronic controls for consideration of the logic employed in the system.

The system, of course, applies to controlling of other fabrics but the examples have been presented with respect to double knits because they are the most difficult to control. In FIG. 8 there is disclosed the alternative arrangement of employing discrete detector heads in lieu of a scanning device and such heads are being shown at 225 through 229 in FIG. 8. They each have calibration circuits 225'-229' (commercially available from Laboratory For Electronics Corp. under designation Z2 D954374) to offset the differences of the Beta gauge and all signals are brought to multiplexer 231 for sequential application to the linearizer 233 and then to averager 235 for storing and obtaining the average value of, in this case, five separate input signals. But, two or ten detector heads or whatever convenient number may be employed in lieu of the five illustrated herein.

The electronics otherwise is shown in the error calculator circuit 237 (available from Burr-Brown designated 4098/25) which includes a target input 239 and provides the overfeed speed control output on lead 240.

Figure 9:
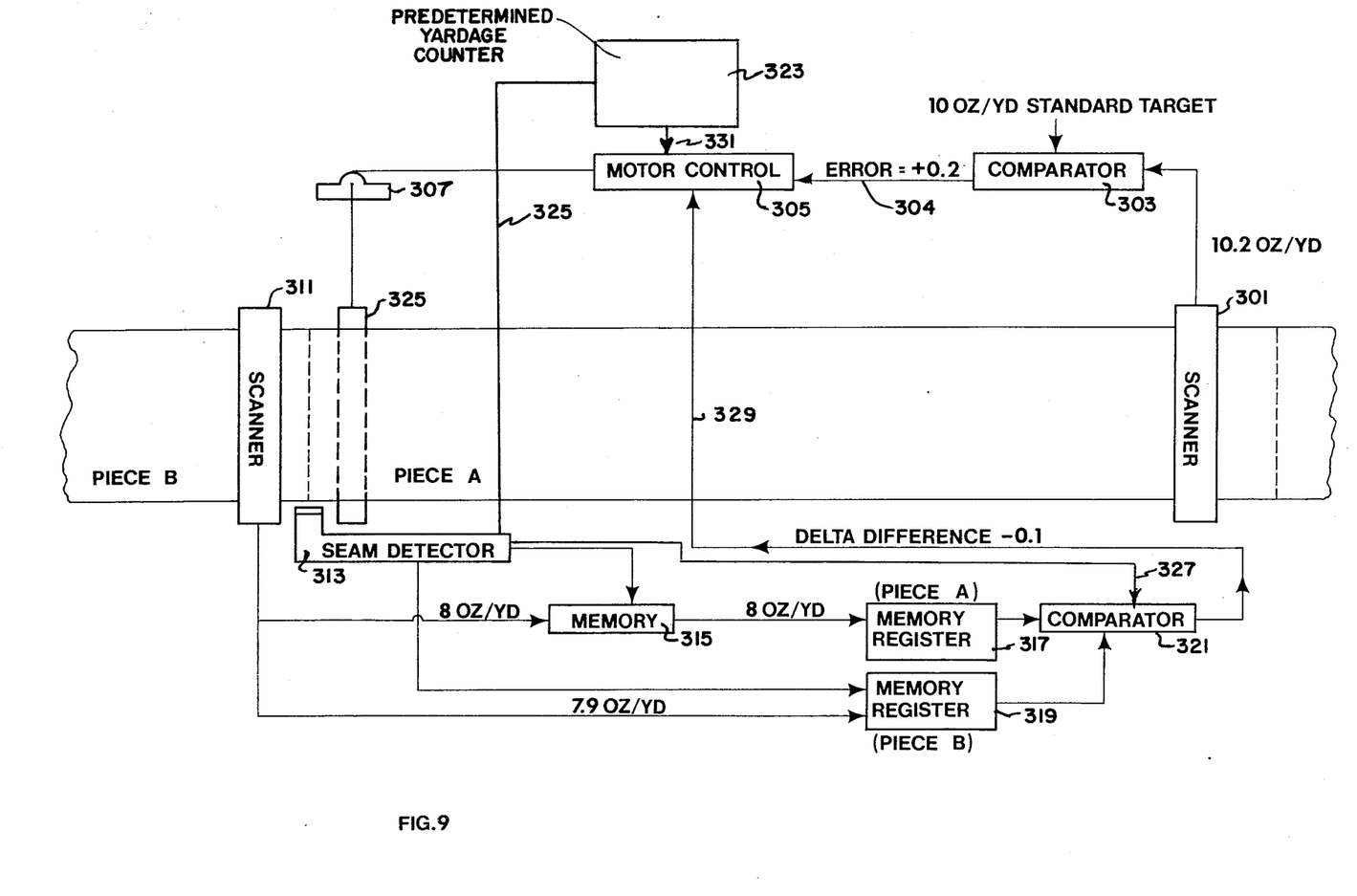

FIG. 9 is a box-type arrangement to show the preferred logical controls developed to control basically the two variables discussed herein, namely, the difference in weight of successive pieces and the amount of over or under feed required to correct the weights of the successive pieces. It should be understood that it is not necessary to know the exact amount of over or under feed at any given time but what is really developed by this control circuitry is the correct percentage deviation in the over or under feed from its setting on one piece to a new setting on the next piece to correct the finished weight of the next piece.

Conventional passline delay techniques may be incorporated into the present invention to advantage, particularly where long pieces are being controlled. For example, if pieces of the order of 90 yards are stitched together, it may be desirable to effect control at every 10 or 15 yards, in which case the conventional techniques would take over within the length of a piece, subject to priority of the present control upon seam detection.

Scanner 301 (FIG. 9) is constantly measuring the weight of the finished fabric. This measurement is compared with the desired weight at comparator 303, resulting in the error signal being passed to motor control 305. At the same time scanner 311 is constantly making measurements. These measurements are stored in memory 315. At the time seam detector 313 detects a seam, the data stored in memory 315 is transferred to memory register 317. This in effect represents the last measurement taken on piece A.

The next completed scan will represent the first measurement taken on piece B. This measurement is transferred to memory register 319. The data stored in memory register 317 is now compared with the data stored in memory register 319 at comparator 321. The resulting signal now represents the differences in the weight between the end of piece A and the beginning of piece B.

The signal out of comparator 321 is now algebraically added to the signal out of comparator 303 at motor control 305. Motor control 305 will affect a speed change on over feed/under feed roll 309 as the seam connecting piece A to piece B approaches over feed/under feed roll 309, the net result being that the system is constantly taking into consideration the fact that there could be a difference in weight between piece A and piece B as they enter the tenter or formative zone.

In the event that a given piece is considerably longer than the tenter, it is sometimes desirable to take corrective action based entirely on the output of comparator 303. This is accomplished through a conventional technique referred to as passline delay and under control of predetermined yardage counter 323. This device simply counts yardage and allows motor control 305 to effect the speed change on motor 307 at predetermined increments of piece length. For example, the counter could be set to take control action based on the output of comparator 303 every 20 yards. However, counter 323 will always be reset at any time it receives a signal from seam detector 313 over reset line 325 because at this time, it is known that a piece change may be approaching the formative zone and the fact that piece B might be coming in at a different weight than what piece A did must be considered. The sequence then starts over and repeats itself.

It is important to note that comparator 321 is only allowed to output a signal when seam detector 313 has detected a seam. This signal is on line 327. At other times, line 329 is in a neutral condition.

In the absence of counter 323, the continuous signal from scanner 301 is ineffective to affect any motor speed adjustment at motor 307 until seam detector signals on line 327 release the output of comparator 321 to line 329 for algebraic summation with error on line 304. However, in the presence of counter 323, the latest scanned and averaged output signal of scanner 301 is used to adjust the motor speed at motor 307 whenever the yardage counter 323 indicates the 15 or 20 yard increment where adjustment is to take place over line 331.

What is claimed is:

1. The method of controlling finished absolute fabric weight per unit length of a strip of moving fabric made up of a plurality of pieces using a machine having a formative zone comprising the steps of:
   a. predetermining the desired weight per unit length of the finished fabric;
   b. sensing the absolute weight per unit length of the finished fabric;
   c. determining any weight per unit length error difference between said predetermined weight and sensed weight;
   d. recognizing the beginning and end of each piece of fabric; and,
   e. adjusting the input feed-rate according to the error difference when the beginning of a discrete piece enters the formative zone.

2. The method of claim 1 comprising the further steps of:

measuring the amount of fabric passing from the formative zone to the point of sensing;

further enabling said adjusting of the input feed-rate at predetermined increments of fabric travel; and disabling said adjusting when the beginning of each subsequent piece in said strip is recognized.

3. The method of claim 2 comprising the further step of:

automatically repeating the foregoing steps upon recognizing the beginning of each piece.

4. The method of finishing multi-piece strip material to a predetermined absolute weight per unit length comprising the steps of:

a. moving the material along a path;

b. establishing a relaxed condition in the moving material at a station;

c. accurately predicting the weight per unit length of the relaxed moving material at said station to provide a finished weight per unit length;

d. comparing the finished weight per unit length to the predetermined weight per unit length to determine any difference;

e. using said difference to effect speed change of the moving material at a speed changing station spaced from the first mentioned station necessary to change the weight per unit length of the finished material to said predetermined finished weight per unit length at predetermined increments of fabric strip travel.

5. The method of finishing multi-piece strip material to a predetermined weight per unit length wherein the material includes one or more seams across the width thereof between the pieces thereof comprising the steps of:

a. moving the material along a path;

b. determining the weight per unit length of the finished moving material at a station to develop a finished weight per unit length;

c. comparing the finished weight per unit length to the predetermined weight per unit length to determine any error difference;

d. establishing a speed changing station along the path spaced from and upstream of the first mentioned station;

e. determining the pre-finished weight per unit length of a first strip of the moving material at a point along the strip travel path prior to the speed changing station before the beginning of a second piece passes the speed station to obtain the weight per unit length thereof;

f. determining the pre-finished weight per unit length of said second piece of the moving material prior to the speed changing station to obtain the weight per unit length of the material following;

g. comprising said weights per unit length to obtain any difference thereof;

h. algebraically combining any said finished weight per unit length error and any said pre-finished weight per unit length difference to obtain control information; and i. changing the speed at said speed changing station in response to said control information as the beginning of the second piece passes said speed changing station.

6. The method of claim 5 comprising the further step of:

monitoring the travel of the beginning of the second piece from the speed changing station to said first mentioned station; and further changing the speed of strip travel at the speed changing station at increments of the monitored travel.

7. The method of controlling finished fabric weight per unit length using absolute weight per unit length and sensed weight per unit length comprising the steps of:

a. determining the difference between the desired absolute weight per unit length of the finished fabric and the sensed weight per unit length of the finished fabric.

b. establishing a primary feed station, and infeed station to a tenter with tension control means therebetween;

c. sensing and storing the per unit length of the pre-finished material at a point between the feed station and the infeed station to the tenter;

d. establishing a material stripping station from the downside of the tenter, and delivering means from the stripping station with tension control means between;

e. determining that a new piece of fabric has reached the entry side of the delivery means;

f. sensing the weight per unit length of the finished fabric and comparing it to the absolute weight per unit length of the finished fabric at intervals of fabric travel between the stripping station and the delivery means;

g. determining that a new piece of fabric has reached the exit side of the primary feed station; and h. sensing the weight per unit length of the pre-finished material and comparing this weight with the stored weight per unit length of the prefinished material to determine the percent difference in weight per unit length of the piece in the tenter to the new piece that will subsequently reach the infeed station to the tenter.

8. Apparatus for controlling fabric weight per unit length of a multi-piece strip of fabric moving through a tenter comprising in combination;

a. means for moving the strip of fabric through the tenter;

b. overfeed-underfeed rolls disposed at the entrance end of the tenter and driven by said means for moving;

c. means for sensing the weight per unit length of the finished fabric pieces exiting the tenter;

d. means for storing a predetermined absolute target weight per unit length for the fabric pieces;

e. means for averaging and linearizing the sensed weight;

f. means for comparing the averaged and linearized sensed weight to the target weight for determining any difference;

g. means for detecting the beginning of each piece prior to entry into the overfeed-underfeed rolls; and h. means for using any difference to control the speed of said moving fabric strip at least where the beginning of each piece is detected.

9. The apparatus of claim 8 including further means for relieving tension in the fabric at the tenter exit.

10. The method of claim 9 further comprising:

a. means for measuring the amount of fabric strip passing through the tenter and controlling the speed of said rolls at increments of fabric strip travel if any difference has been determined.

11. Apparatus for controlling fabric weight per unit length of seam pieced-together fabric moving through a tenter, comprising in combination:
   a. means for moving the fabric through the tenter;
   b. entry seam detector means at the entrance end of the tenter;
   c. overfeed-underfeed rolls disposed adjacent the entrance end of the tenter and driven by said means for moving;
   d. means for sensing the fabric finished weight per unit length exiting the tenter;
   e. exit seam detector means at the exit end of the tenter;
   f. means for storing a predetermined absolute target fabric weight per unit length;
   g. means for averaging ans linearizing the weight from the means for sensing;
   h. means for comparing the averaged and linearized weight to the target weight for determining any difference;
   i. control sequencer comparator means; and
   j. means for applying the said any difference to the comparator means together with information from the entry and exit seam detector means to said comparator means to provide an output control signal to said means for moving.

12. Apparatus for controlling finished fabric weight per unit length of fabric consisting of pieces linked together by seams in a web of fabric moving through a tenter comprising in combination:
   a. means for moving the fabric web through the tenter;
   b. first means for sensing the fabric weight per unit length entering the tenter;
   c. overfeed-underfeed rolls disposed at the entrance end of the tenter and driven by said means for moving;
   d. second means for sensing the finished fabric weight per unit length after it has passed through the tenter;
   e. seam detector means at the entrance end of the tenter for detecting any seams to provide a seam signal;
   f. speed control means for the means for moving;
   g. memory means responsive to the first means for sensing to store the weight of a piece of fabric passing the first means for sensing;
   h. first memory register means connected to receive the weight of fabric of said piece from said memory means upon the detection of a seam by application of the seam signal to said memory means;
   i. second memory register means connected to receive the weight of fabric of the succeeding piece to said piece from said first means for sensing also under control of said seam signal;
   j. comparator means connected to compare the weights received by said registers and develop a delta difference signal;
   k. further comparator means;
   l. means for inputting a predetermined absolute target weight per unit length to the further comparator means;
   m. means for inputting the weight from the second means for sensing to said further comparator means to produce, in combination with the target weight, an error signal; and
   n. means at the speed control means for algebraically combining said delta difference signal and said error signal to control the overfeed-underfeed rolls via said speed control means and means for moving.

13. The apparatus of claim 12 further comprising:
   a. predetermined yardage counter means connected to said speed control means for controlling the same at predetermined increments of web travel; and
   b. means for resetting said predetermined yardage counter means by each seam signal.

* * * * *